INVENTOR
EARL C. DAVIS

March 18, 1969  E. C. DAVIS  3,433,503
TRAILER COUPLER
Filed Oct. 30, 1967

INVENTOR
EARL C. DAVIS

BY *Baldwin, Wight, Diller & Brown*

ATTORNEYS

United States Patent Office 3,433,503
Patented Mar. 18, 1969

3,433,503
TRAILER COUPLER
Earl C. Davis, 2018 S. 3rd St., Waco, Tex. 76706
Filed Oct. 30, 1967, Ser. No. 678,866
U.S. Cl. 280—512                      8 Claims
Int. Cl. B52d 53/06; B60d 1/06, 1/12

ABSTRACT OF THE DISCLOSURE

An upstanding shank is carried by a part of a truck or tractor and adapted for connection with a socket at the forward end of a gooseneck carried by the trailer. The socket includes a body of semicircular cross-section having a hemispherical ball-receiving recess. A locking member having a plate provided with a keyhole slot is pivoted concentrically to the body for swinging movement from a ball-receiving to a ball-locking position to hold the ball in the socket to connect the trailer to the tractor or truck.

Background of the invention

The invention relates to the field of couplers for connecting trailers to trucks or tractors. Devices of this kind have been open to objects for various reasons. For example, some are relatively complicated and expensive to manufacture; others do not provide a sturdy, rugged connecting construction; and others are awkward or time-consuming in use for connecting a trailer to a vehicle.

Summary of the invention

An upstanding shank is rigidly connected at its lower end to the bed or other portion of a truck and is provided at its upper end with a ball. The trailer is provided with a forwardly and downwardly extending gooseneck at the bottom of the lower end of which is carried means for positively connecting the ball to the gooseneck to establish towing connection between the truck and trailer. This connecting means comprises a heavy, preferably steel body, curved semi-cylindrically from front to rear and provided in the bottom thereof with a socket for receiving the ball. An arcuate locking plate is pivoted to the body concentrically with the semi-cylindrical surface thereof. The plate is provided with a bayonet or keyhole slot having a circular enlarged portion at the forward end of the slot and a narrower portion at the rear end of the slot to fit around the shank beneath the ball. When the locking plate is swung in one direction the circular enlarged end of the bayonet slot registers with the socket therebeneath to allow for the insertion of the ball into the socket. The locking plate is then rocked in the opposite direction to lock the ball in position, the narrow end of the bayonet slot being of substantially less width than the diameter of the ball.

Detent means is employed for holding the locking plate either in locking or inoperative position, and such means comprises a spring pressed ball carried by the locking plate and engageable in either of a pair of recesses in the body. The locking plate is provided with a handle extending radially outwardly from the axis of rocking movement of the locking plate, and is drilled or otherwise made hollow to receive the spring and ball which serve as the detent means. The locking plate is provided with side walls fitting against parallel side walls of the body, and the pivot pin for rockably connecting the locking plate to the body passes transversely through the side walls of the locking plate and through the body. The body and the side walls of the locking plate are provided with openings registering when the ball is locked in position, and a pin insertable through the registering openings serves positively to lock the plate against movement.

An object of the invention is to provide a trailer coupler or hitch which is of rugged construction, certain and safe in operation, easy to couple and uncouple, and which eliminates as far as possible the disadvantages of trailer couplers or hitches previously known.

Description of the preferred embodiment

Figure 1:
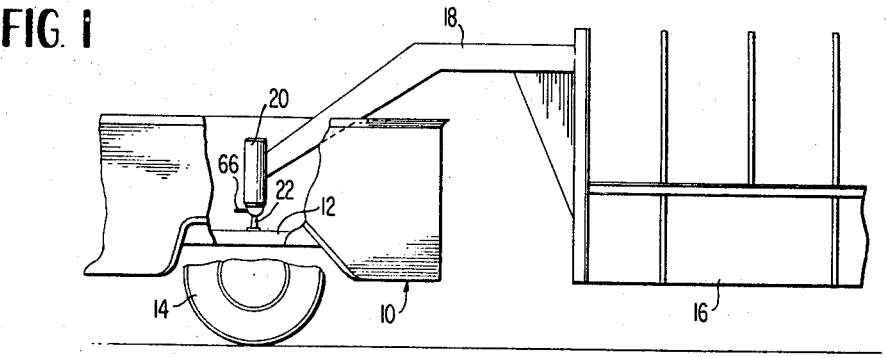
FIGURE 1 is a side elevation of portions of a truck and trailer, showing a coupler embodying the invention in coupling position, parts being broken away.

Referring to FIGURE 1, the numeral 10 designates a truck of the open body type having a bed 12 supported on the usual rear wheels 14. The truck is intended to haul a trailer 16, having a forwardly and downwardly extending gooseneck 18. The gooseneck is usually formed of forwardly converging arms connected at their forward ends by a vertical member 20.

Figure 2:
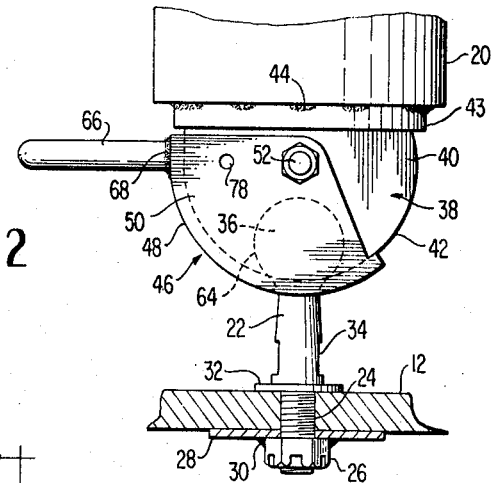
FIGURE 2 is an enlarged side elevation of the hitch or coupler and associated elements, parts being shown in section.

As shown in FIGURE 2, a shank 22 projects at its lower end through the bed 12 of the truck and is threaded at 24 to receive a nut 26. When the nut is engaged with the threads 24 and tightened in position, it bears against a plate 28 to which it is preferably welded as at 30. An upper washer 32 rests on the truck bed 12 and engages the shoulder formed at the lower end of the shank 22, this shank preferably being flattened above the washer 32 as at 34 to be engaged by a wrench while the nut 26 is being tightened. The upper end of the shank 22 carries a ball 36, preferably integral therewith.

The hitch further comprises a body 38 having flat parallel side walls 40 and being provided with a semicylindrical bottom, forward and rear surface 42. The body 38 is preferably integral with a top plate 43 which is semicircular and preferably is welded as at 44 to the lower end of the member 20.

Figure 7:
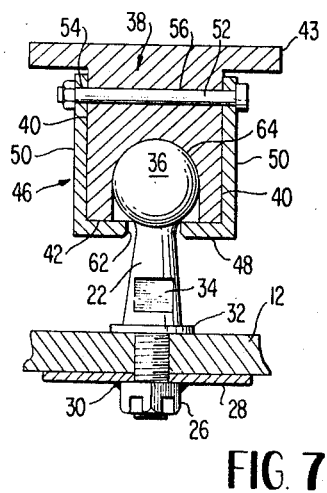
FIGURE 7 is a section on the line 7—7 of FIGURE 3.

A locking member 46 is provided with a semicircular wall 48 concentric with the face 42 of the body 38. The locking member further comprises parallel side walls 50 (FIGURE 7) slideable over the flat opposite faces 40 of the body 38. A bolt 52 passes through openings 54 in the side walls 50 and through an opening 56 in the body 38. The axis of this bolt is coincident with the axis of curvature of the face 42 and the curved wall 48 of the locking member.

Figure 8:
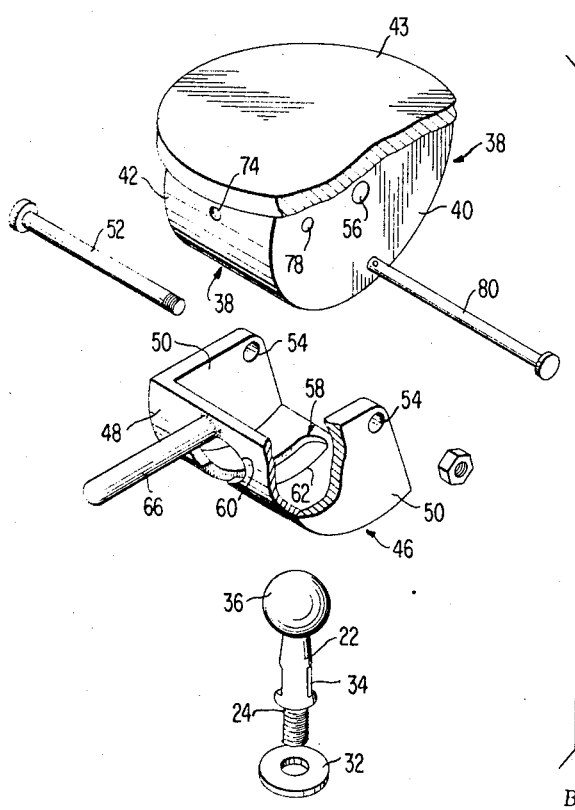
FIGURE 8 is a detailed perspective view of the several parts of the hitch, portions being broken away.

The plate wall 48 of the locking member is provided with a bayonet slot 58 having an enlarged circular end 60 of a diameter to permit the ball 36 to pass therethrough, and is further provided with a narrower end 62 (FIGURES 5, 6 and 8) of a width slightly greater than the diameter of the adjacent portion of the shank 22. When the locking member is in the position as shown in FIGURE 4, the enlarged bayonet slot portion 60 registers with a hemispherical recess 64 in the body 38 so that when the forward end of the gooseneck 18 is lowered, the ball 36 will enter the recess 64.

Figure 3:
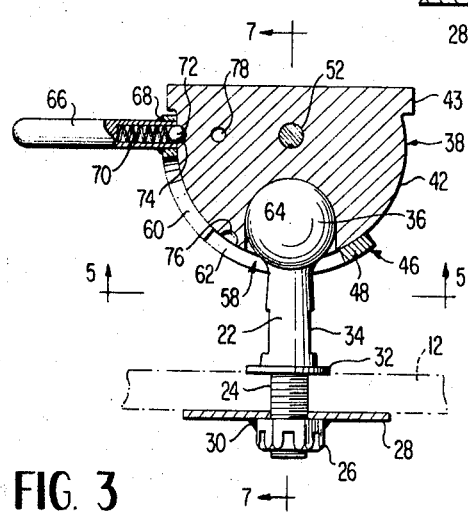
FIGURE 3 is a vertical sectional view through the hitch and associated elements taken through the axis of the ball socket, and showing the ball in position in the socket.
Figure 4:
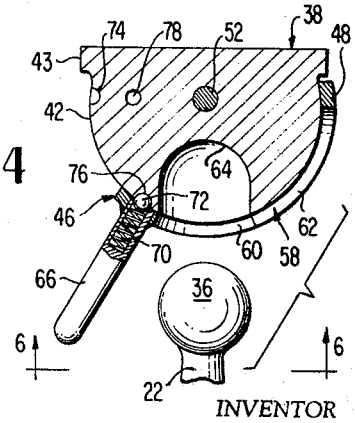
FIGURE 4 is a similar view showing the locking plate unlocked prior to the insertion of the ball into the socket.

The locking member is adapted to be turned from the position shown in FIGURE 4 to the position shown in FIGURE 3, the locking plate rocking about the axis of the bolt 52. This places the narrower portion 62 of the bayonet slot on opposite sides of the shank 22 and effectively locks the ball 36 in the recess 64. Such rocking movement of the locking plate is facilitated by a handle 66 which may be formed separately from the locking member 46 and welded thereto as at 68. The handle 66 is recessed axially for the reception of a compression spring 70 bearing on a ball 72 engageable in either of a pair of hemispherical recesses 74 or 76 in the body 38 to hold the locking member 46 in either locked or unlocked position, as shown respectively in FIGURES 5 and 6. The handle greatly facilitates movement of the locking member 46 between these two positions, and serves to receive the elements of the detent means which hold the locking member in either of its two positions.

It is desirable to provide an easily operable means forming a positive lock for the locking plate. To this end, the side walls 50 and body 38 are provided with registering openings 78 to receive a heavy pin 80, insertable through the device when the parts are in the locking position shown in FIGURE 3. The pin may be secured in its inserted position in any suitable manner.

Figure 5:
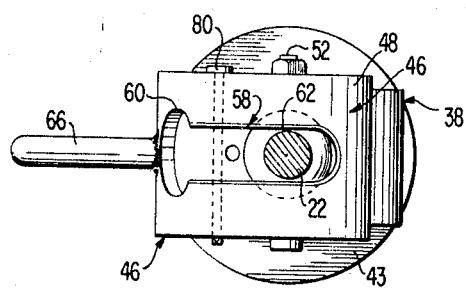
FIGURE 5 is a section on the line 5—5 of FIGURE 3.
Figure 6:
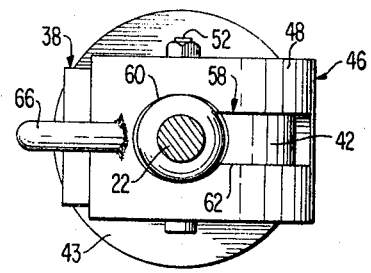
FIGURE 6 is a section on the line 6—6 of FIGURE 4.

From the foregoing it will be apparent that the present device is highly simplified, rugged in construction and easily operable, and that it serves as a reliable positive means for connecting a truck to a trailer to haul the latter and to permit the ball connection to rock in any direction to whatever extent is necessary. In connecting the trailer to the truck, the handle 66 will be pushed downwardly to the position shown in FIGURE 4, whereupon the forward end of the gooseneck is lowered so that the ball 36 is relatively movable into the recess 64. At this time the detent ball 72 will be in the recess 76. The handle 66 will now be pulled upwardly to the position shown in FIGURE 3, whereupon the locking member will be rocked so that the shank 22 will be arranged within the narrow end 62 of the bayonet slot 58. The ball 72 will snap into the recess 74 and will serve as an effective means for holding the locking plate in locking position. However, to provide an additional and positive connection between the body 38 and locking member 46, it is preferred that the pin 80 be employed. When the ball 72 snaps into the recess 74, it acts as a positioning means to align the openings 78 through the locking member 46 and body 38. The pin 80 then may be quickly and easily slipped into position as shown in FIGURE 5 to lock the parts positively together. These various operations can be completed in a matter of a few seconds.

The construction shown and described embodies the invention in one preferred form, but it is intended that the disclosure be illustrative rather than definitive.

I claim:

1. A trailer hitch comprising an upstanding shank fixable at its lower end to a portion of a truck and provided at its upper end with a ball; a hitch body provided in its bottom with a socket adapted to receive and fit said ball, said body being provided with a lower semi-cylindrical surface through which said socket opens; and a locking member having a semi-cylindrical wall slidable over the semi-cylindrical face of said body and pivoted to said body for turning movement on the axis of said semi-cylindrical surface, said locking member being rockable to an inoperative position in which said ball is movable into said socket and being rockable to an operative position with portions of said locking member disposed on opposite sides of said shank a distance less than the diameter of said ball to prevent the latter from moving out of said socket.

2. A hitch according to claim 1 wherein said semi-cylindrical wall is provided with a bayonet slot having a narrow end, opposite portions of which constitute said portions disposable on opposite sides of said shank to maintain said ball in said socket, said bayonet slot having a larger end registering with said socket when said locking plate is in inoperative position for permitting the relative insertion of said ball in said socket.

3. A hitch according to claim 2 provided with detent means movable with said locking member, said semi-cylindrical face of said body being provided with detent-receiving recesses, one of which receives said detent means in the operative position of said locking member and the other of which receives said detent means when said locking member is in inoperative position.

4. A hitch according to claim 2 provided with detent means movable with said locking member, said body in said semicylindrical face thereof being provided with detent-receiving openings, one of which receives said detent means in the operative position of said locking member and the other of which receives said detent means when said locking member is in inoperative position, said body being provided with opposite parallel faces, said locking member being provided with opposite parallel walls slidable over said parallel faces, and said parallel walls and said parallel faces having openings aligned when said locking member is in said operative position; and a pin insertable through said aligned openings to lock said locking member positively to said body.

5. A hitch according to claim 1 provided with a handle carried by said locking member and projecting radially therefrom to facilitate movement of said locking member between its said operative and inoperative positions.

6. A hitch according to claim 5 wherein said handle is provided with an axial recess, and further including a compression spring in said recess; and a detent ball engaged by said spring and urged toward said body, said body being provided with a pair of detent-receiving recesses respectively receiving said detent ball in said operative and inoperative positions of said locking member.

7. A hitch according to claim 6 wherein said locking member is provided in said semi-cylindrical wall with a bayonet slot having a narrow end, opposite portions of which form said portions of said locking member at opposite sides of said shank to prevent movement of the ball on said shank out of said socket, said bayonet slot having a wider end disposed beneath said ball in said inoperative position of said locking member for movement of said ball into and out of said socket.

8. A hitch according to claim 1 wherein said body is provided with opposite parallel faces, said locking member is provided with opposite parallel walls slidable over said parallel faces, said parallel walls and said parallel faces have openings aligned when said locking member is in said operative position, and a pin insertable through said aligned openings positively to lock said locking member to said body.

References Cited

UNITED STATES PATENTS

| 1,636,295 | 7/1927 | Dempsey | 280—513 |
| 2,558,906 | 7/1951 | Leon | 280—511 |
| 3,390,896 | 7/1968 | Philapy | 280—423 |

FOREIGN PATENTS 263,166  11/1949  Switzerland.

LEO FRIAGLIA, *Primary Examiner.*

U.S. Cl. X.R.

24—211; 280—423